(No Model.)

J. E. DIEFFENBACHER.
HARNESS ATTACHMENT FOR VEHICLE SHAFTS.

No. 257,669. Patented May 9, 1882.

WITNESSES
F. L. Ourand.
Wm. L. Spiden.

INVENTOR
John E. Dieffenbacher
per Chas. H. Fowler,
Attorney

UNITED STATES PATENT OFFICE.

JOHN E. DIEFFENBACHER, OF EDWARDSBURG, MICHIGAN.

HARNESS ATTACHMENT FOR VEHICLE-SHAFTS.

SPECIFICATION forming part of Letters Patent No. 257,669, dated May 9, 1882.

Application filed March 6, 1882. (No model.)

*To all whom it may concern:*

Be it known that I, JOHN E. DIEFFENBACHER, a citizen of the United States, residing at Edwardsburg, in the county of Cass and State of Michigan, have invented certain new and useful Improvements in Means for Attaching Harness to Shafts; and I do hereby declare that the following is a full, clear, and exact description of the same, reference being had to the annexed drawings, making a part of this specification, and to the letters and figures of reference marked thereon.

Figure 1:
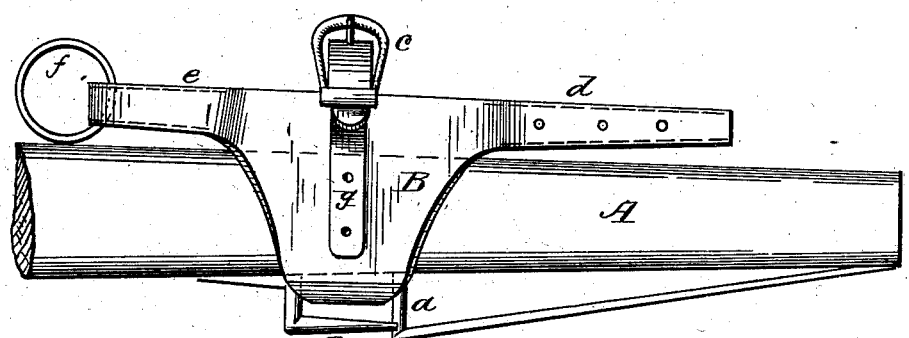
Figure 2:
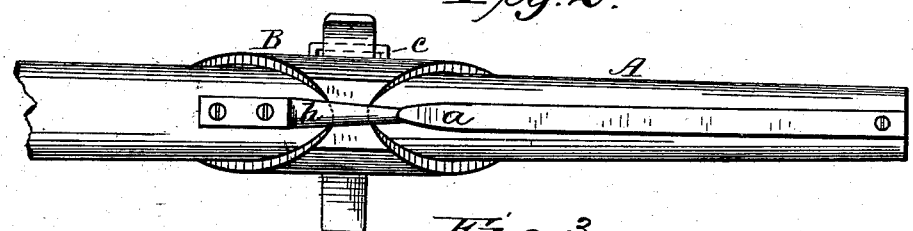
Figure 3:
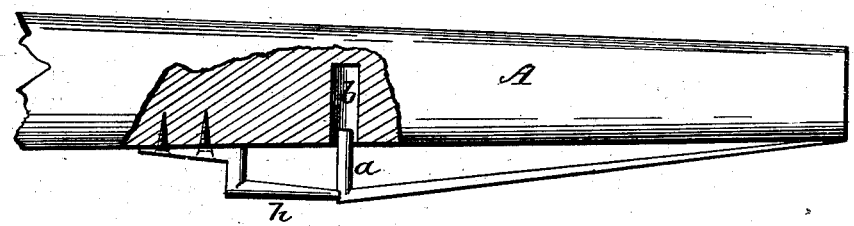
Figure 4:
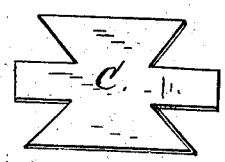

Figure 1 of the drawings is a side elevation of my invention; Fig. 2, an under plan view; Fig. 3, a side elevation of the thill, partly in section; and Figs. 4 and 5, detail views.

The present invention has relation to certain new and useful improvements in means for connecting the harness to the thills or shafts of a vehicle; and the object thereof is to provide a simple and effective device whereby the horse can be quickly and expeditiously hitched or unhitched from the vehicle without the employment of the usual traces and whiffletree as a means of attachment. These objects I attain by the construction substantially as shown in the drawings and hereinafter described.

In the accompanying drawings, A represents the end of the shaft of a vehicle, having secured to its under side a spring-catch, $a$, the free end entering a mortise, $b$, in the shaft. On a line opposite the vertical portion or free end of the spring-catch $a$ is a confining-arm, $h$, also connected to the shaft A, by screws or other suitable means, which, together with the spring-catch, form means by which a leather girdle, B, is held in position on the shaft. The girdle has connected to it a suitable buckle, $c$, for buckling into the saddle-strap of the harness; also, strap $d$, for connecting with the breast-strap or short tug of the collar, and a strap, $e$, provided with ring $f$, for the purpose of connecting with breeching of harness. The small strap $g$, secured to the side of the girdle B, is for connecting with the belly-band of harness. After the girdle B has been properly attached to the harness of the horse it is then slipped over the end of the shaft A, which will compress the spring-catch $a$ as it is moved along, and when beyond the end of the same the catch will resume its normal position, and, in connection with the arm $h$, hold the girdle securely upon the shaft, thereby obtaining the draft from the shafts direct without the use of tugs or traces or the usual whiffletree. A further advantage is the ease and rapidity with which the horse can be attached or detached from the vehicle, the leather girdle, with its adjuncts, being cheap, durable, and effective, as well as very simple in its construction, thereby enabling it to be manufactured at a comparatively small cost.

Figure 5:
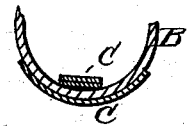

To prevent wear upon the under side of the girdle B, I line it, both upon the inner and outer side, by a metal plate, C, which may be of the form shown in Fig. 5, and afterward bent over and upon the leather; or the metallic lining may be secured in any suitable manner by rivets or otherwise.

Having now fully described my invention, what I claim as new, and desire to secure by Letters Patent, is—

The shaft A, having connected to it the spring-catch $a$ and confining-arm $h$, in combination with the girdle B, having buckle $c$, straps $d\ g$, and strap $e$, with ring $f$, substantially as and for the purpose set forth.

In testimony that I claim the above I have hereunto subscribed my name in the presence of two witnesses.

JOHN E. DIEFFENBACHER.

Witnesses:
 MOSES H. LEE,
 JOEL CASE.